Patented Sept. 5, 1933

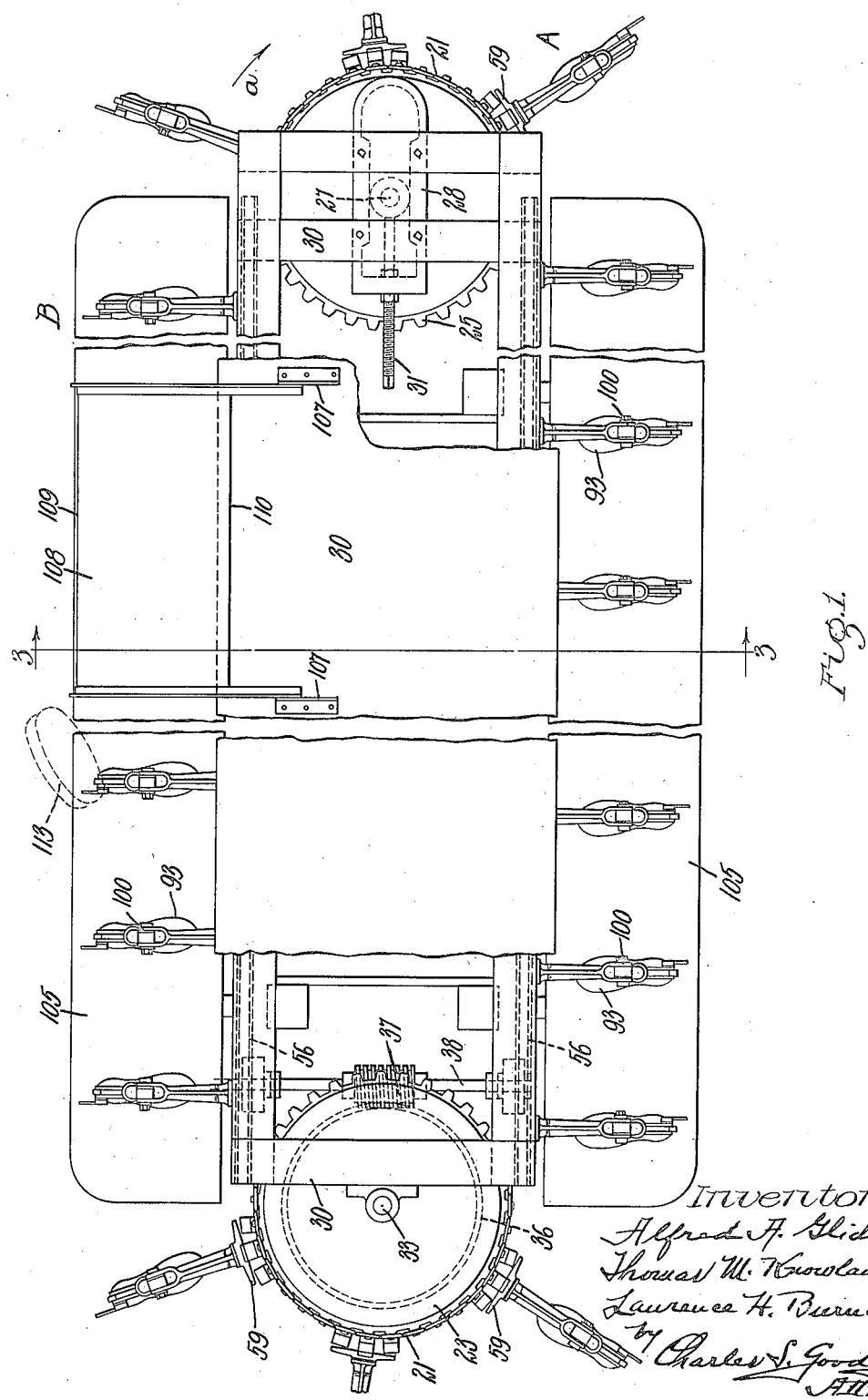

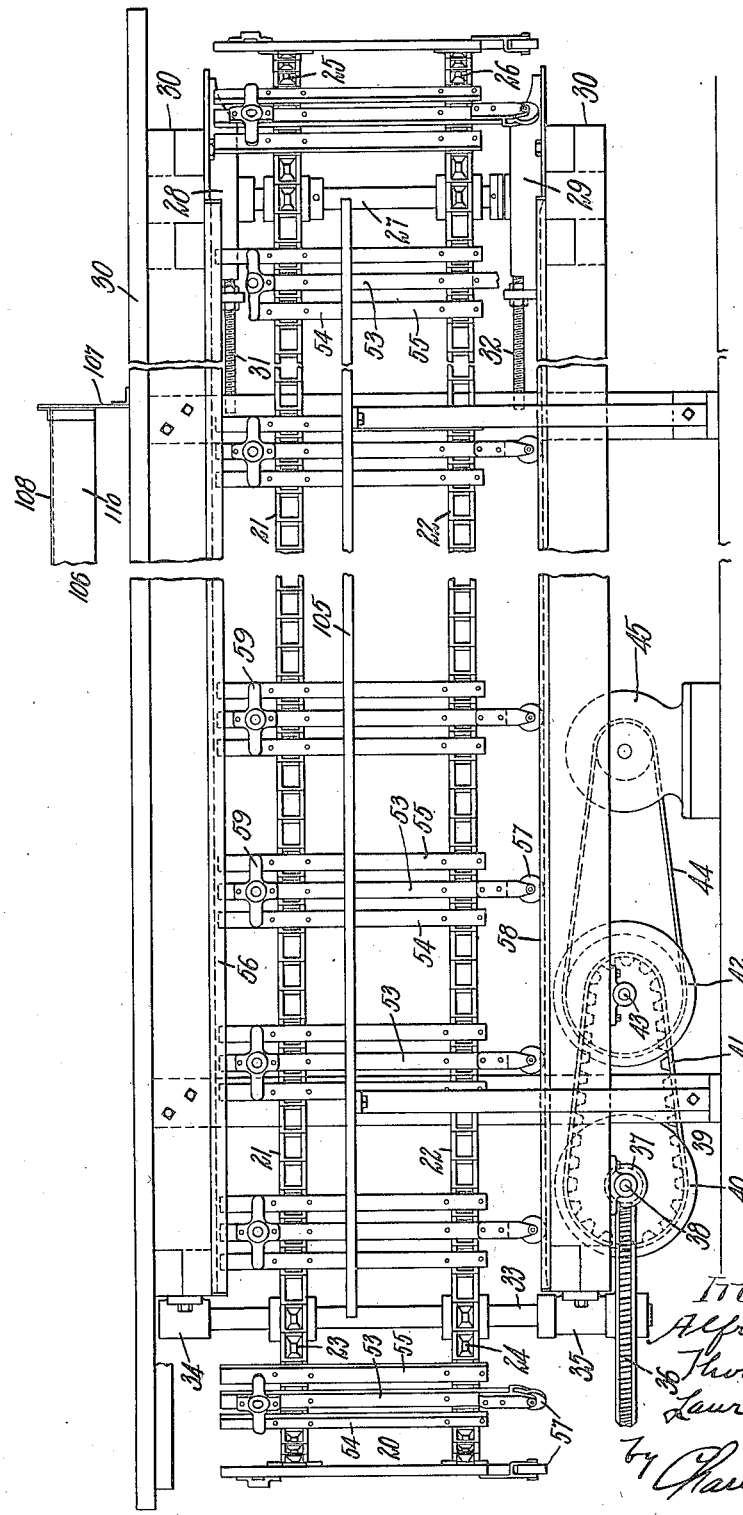

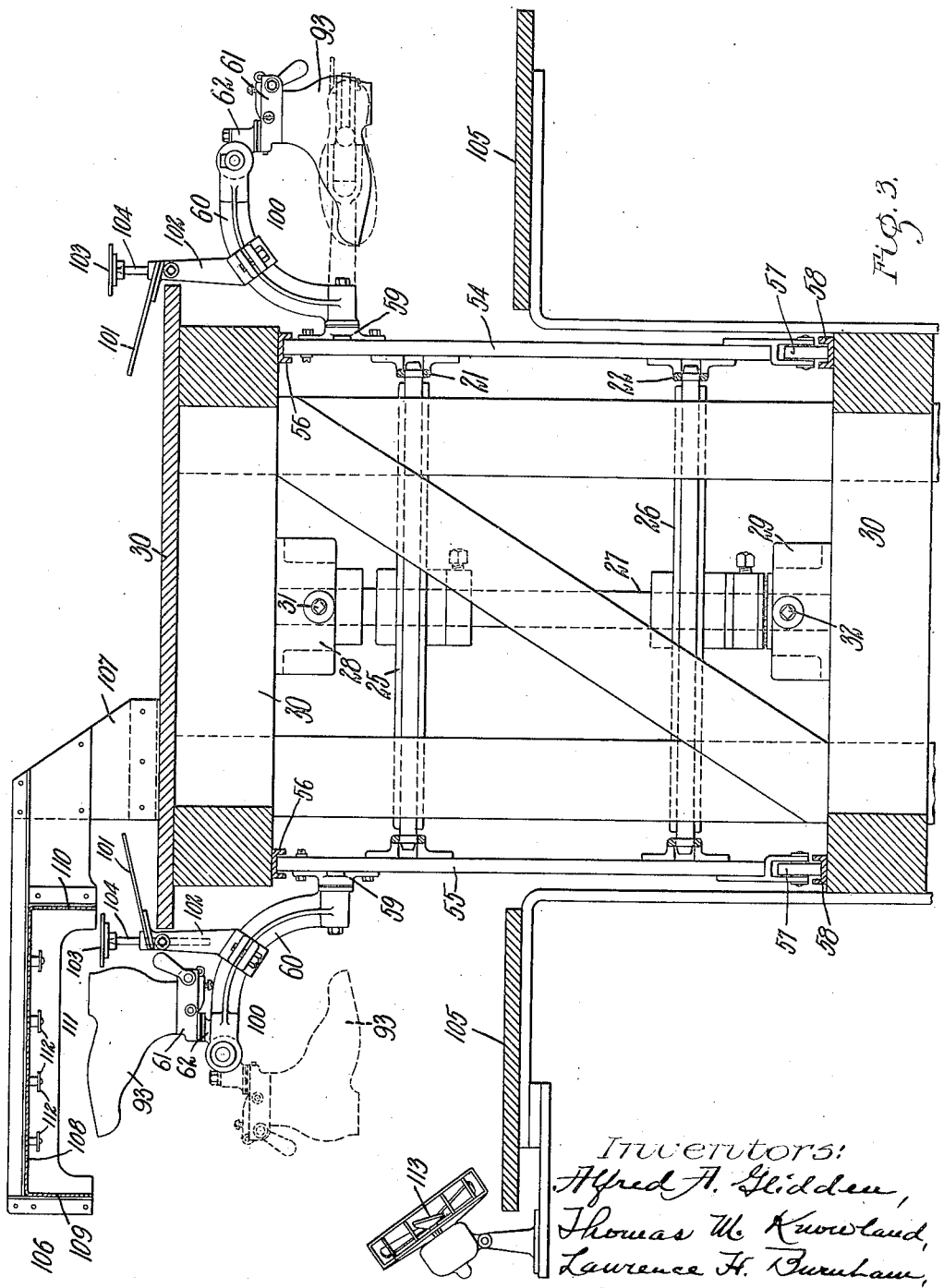

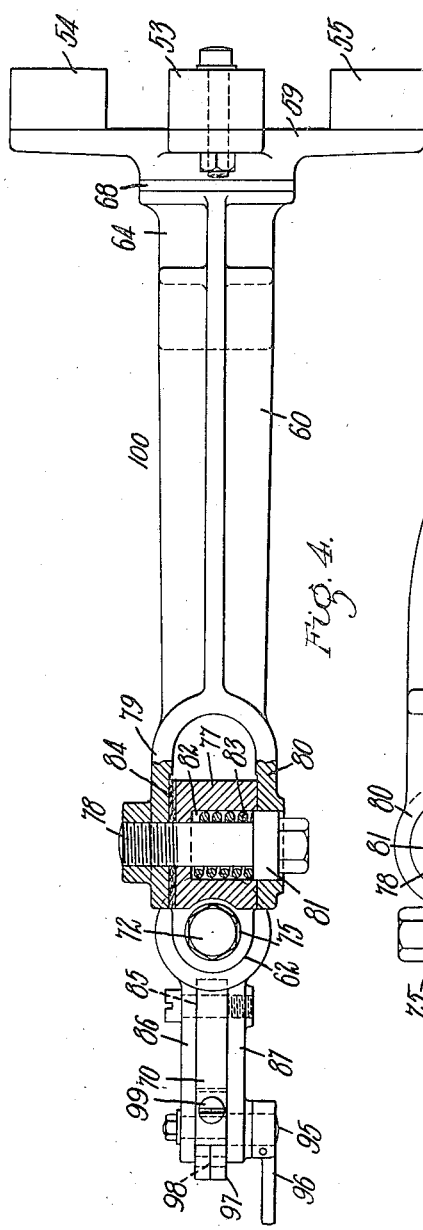

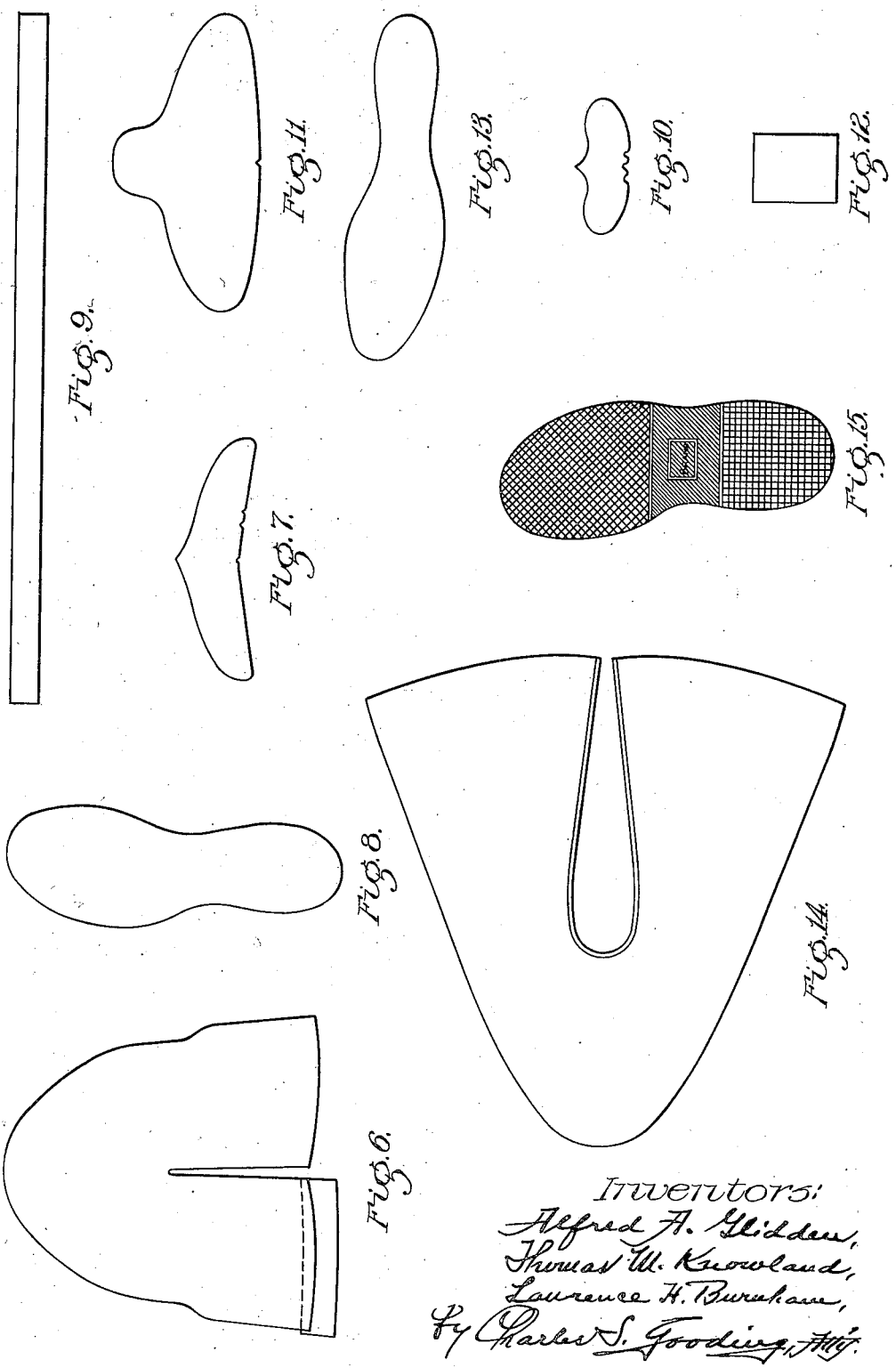

1,925,899

UNITED STATES PATENT OFFICE 1,925,899

APPARATUS FOR MANUFACTURING FOOTWEAR

Alfred A. Glidden and Thomas M. Knowland, Watertown, and Laurence H. Burnham, Lexington, Mass., assignors, by mesne assignments, to Hood Rubber Company, Inc., Wilmington, Del., a corporation of Delaware Application November 10, 1927
Serial No. 232,419

3 Claims. (Cl. 12—1)

This invention relates to an improved apparatus for manufacturing shoes and the like.

The object of the invention is to provide an apparatus whereby shoes of different kinds, such as men's, women's and youths' rubber shoes, tennis shoes, and rubber boots may be rapidly and efficiently manufactured with the least possible manual labor, and to these ends the invention consists in an apparatus whereby said method may be carried into practical operation, said apparatus comprising a support for a last and means to move said support in an endless path.

In one form of apparatus embodying our invention, and hereafter set forth in the specification, an endless conveyer is provided to which a plurality of supports for lasts are connected, and mechanism is provided to impart to said conveyer a continuous movement, thereby carrying the lasts successively to a plurality of operators. The lining of the shoe is first placed upon a last and the different parts positioned upon the lining and the last and conveyed from one operator to another, successive operators attaching to the lining on the last the different parts which are embodied in the shoe which is being manufactured, all as hereinafter fully set forth.

Referring to the drawings:

Figure 1 is a plan view of our improved apparatus for manufacturing shoes, the same being broken away to save space in the drawing, and the tables for the shoe parts also being partly broken away.

Fig. 2 is a front elevation of the same also broken away, and the last supports being omitted.

Fig. 3 is a sectional elevation taken on line 3—3, Fig. 1, viewed in the direction of the arrows on said line.

Fig. 4 is a sectional plan view of a form of jack or support for the last, upon which the shoe is being constructed.

Fig. 5 is a sectional side elevation of the last support illustrated in Fig. 4 with a last shown in section mounted thereon.

Figs. 6 to 15 are detail plan views of the different parts of a certain type of rubber shoe.

Fig. 6 is a plan view of the lining.

Fig. 7 is a plan view of the rag junior.

Fig. 8 is a plan of the insole.

Fig. 9 is a plan of the gum piping.

Fig. 10 is a plan of the toe tip.

Fig. 11 is a plan of the heel piece.

Fig. 12 is a plan of the shank stay.

Fig. 13 is a plan of the filler.

Fig. 14 is a plan of the gum upper.

Fig. 15 is a plan of the outsole.

Like numerals refer to like parts in the several views of the drawings.

In the drawings, 20 is an endless conveyer consisting of two sprocket chains 21 and 22 which are driven by sprocket wheels 23 and 24 respectively, the sprocket chains passing from the sprocket wheels 23 and 24 to idler sprocket wheels 25 and 26 which are mounted upon a shaft 27 which is supported at its opposite ends in sliding boxes 28 and 29, the sliding boxes being slidable on the frame of the stationary table 30 of the machine and adjustable by screws 31 and 32 to take up slack in the sprocket chains.

The sprockets 23 and 24 are fastened to a shaft 33 journalled to rotate in boxes 34 and 35 on the frame 30. To the lower end of the shaft 33 there is fastened a worm gear 36 which is rotated by a worm 37 fast to a horizontal shaft 38. The shaft 38 is driven by a speed regulating mechanism 39.

The speed regulating mechanism preferably employed is known as the Reeves, and embodies a pair of cone pulleys 40 connected by a belt 41 to another pair of cone pulleys 42 on a shaft 43 which is driven by a belt 44 from an electric motor 45. The speed regulating mechanism being driven from an electric motor 45 the speed at which the endless conveyer travels may be increased or diminished as desired.

The sprocket chains 21 and 22 of the conveyer 20 are connected together by a series of vertical members 53, 54 and 55. The upper ends of these vertical members slide in a channel-shaped track 56 and the lower end of each member 53 has a guide wheel 57 thereon which runs in a channel-shaped track 58. The different vertical members 53 each has fastened to it a bracket 59 upon which is mounted a last jack 100 embodying an arm 60, a holder 61 and a connecting member 62, see Figs. 4 and 5. The arm 60 is mounted to rock upon a horizontal stud 63 which has screw-threaded engagement with the bracket 59. A hub 64 encircles the stud 63 and is provided with a recess 65 in which is positioned a spring 66, one end of which bears against the bottom of said recess, the other end bearing against a flange 67 on the stud 63. Between the hub 64 and the bracket 59 is a friction washer 68, so that by turning the stud 63 the pressure of the spring 66 may be increased and the friction of the hub against the washer 68 be also increased, thus the frictional resistance to rotation or rocking of the arm 60 may be adjusted.

The last holder 61 embodies a pair of jaws 69 and 70, the jaw 69 being fastened by a screw 71 to a stud 72 having screw-threaded engagement with the upper end of said jaw 69. The connecting member 62 is rotatably mounted upon the stud 72 and is provided with a recess 73 in which is positioned a spring 74 which bears at its lower end against the bottom of said recess 73 and at its upper end against a flange 75 on the stud 72. Between the connecting member 62 and the upper end of the jaw 69 is interposed a friction washer 76. By rotating the stud 72 the tension on the spring 74 may be increased or diminished, thus regulating the frictional resistance to displacement of the connecting member 62 upon the last holder 61.

The connecting member 62 is provided with an ear 77 which is mounted to rock upon a stud 78 having screw-threaded engagement with one jaw 79 of the bifurcated end of the arm 60, the other jaw 80 of said bifurcated end forming a support for a flange 81 on the stud 78. The ear 77 is provided with a recess 82 in which is positioned a spring 83, one end of which bears against the bottom of said recess, the other end of which bears against the flange 81, and by turning the stud 78 the tension on the spring 83 can be increased or diminished, thus pressing the ear 77 with greater or less force against a friction washer 84 interposed between the jaw 79 and the ear 77, and thus the frictional resistance to displacement of the connecting member 62 upon the arm 60 may be adjusted.

The jaw 70 of the last holder 61 is pivoted at 85 between two arms 86 and 87 extending laterally from the jaw 69 and the arms 88 and 89 of a spring 90 bear against the jaws 70 and 69 respectively and hold them apart. These jaws are provided with teeth 91 which bear against the walls of a bore 92 provided in the top of the last 93. The teeth 91 may be forced against the walls of the bore 92 with a positive pressure by an eccentric 94 fast to a rock shaft 95 which is mounted to rock in the arms 86 and 87 on the holder 61 and has a handle 96 fast thereto by means of which it may be rocked. The eccentric 94 bears against a plate 97 which is pivoted at 98 to the jaw 70 of the holder and can be adjusted downwardly by an adjusting screw 99, thus by rocking the eccentric 94 by means of the handle 96 the jaws 69 and 70 may be expanded to positively grip the wall of the bore 92 in the last 93.

The lasting jack hereinbefore described and particularly illustrated in Figs. 4 and 5 forms the subject matter of a separate application for Letters Patent by Messrs. Alfred A. Glidden and Arthur Drechsler filed even date herewith for which Letters Patent No. 1,722,698 issued July 30, 1929.

In order that different portions of the shoe being manufactured may be carried along from one operator to another in readiness for attaching the same to the shoe, a table 101 is fastened to a bracket 102, which in turn is clamped to the arm 60 of the lasting jack 100, and another table 103 on a vertical rod 104 is also carried by the bracket 102. The object of these tables is to provide a means whereby one operator, who, perhaps, does not have as much work to do as another operator, is enabled to take a piece of the shoe from a book or from a pile of such pieces and place it on the table 101 or 103, as the case may be, so that as the conveyer passes from her to the next operator these pieces will be ready for the next operator to utilize them without being obliged to pick them from a pile of like pieces or from a book containing such pieces.

Stationary tables 105 extend along opposite sides of the machine in front of the operators, providing means for holding tools or parts of the shoe to be applied and additional storage space for tools and shoe parts is provided by the table 30.

After the different parts have been applied to the last and lining thereon, as hereinafter more fully described, the final step in the operation is to attach the outsole and this is done by first applying a rubber cement to the inner face of the outsole and to the bottom of the shoe. Then it becomes necessary to dry the cement thus applied to a certain extent, that is, enough to evaporate the solvent in the cement until the cement becomes tacky, and this portion of the operation is accomplished by means of a dryer 106 which is supported by a bracket 107 on the frame of the machine and has a top 108 and sides 109 and 110 forming a heating chamber 111 in which is provided a plurality of electric heating elements 112. These heating elements heat the air in the dryer 103, so that the cement on the sole of the shoe and on the bottom of the shoe as they pass along beneath the dryer is heated and the solvent evaporated until the cement becomes tacky. In order to still further assist in the evaporation of the solvent contained in the cement a fan 113 is preferably employed to cause the air in the dryer to circulate and thus more efficiently perform the drying operation.

The general operation of the mechanism hereinbefore described is as follows:—Assuming the endless conveyer to be moving in the direction of the arrow a, Fig. 1, the first operator will be positioned preferably at A and the last operator at B. The other operators will be positioned at a distance apart from each other preferably equal to twice the distance between the centers of adjacent jacks. The sequence of operations in the manufacture of a typical rubber shoe is as follows:—Assuming the conveyer to be travelling in the direction of the arrow a, Operator No. 1, located at A, selects a last, pulls a lining, Fig. 6, over the last and places the last on a jack on the conveyer with the toe and the sole at an angle of preferably 45°. She does this by pressing the last 93 downwardly upon the jaws 69 and 70 which, being tapered at their lower ends, enter the bore 92 in the top of the hollow last 93 readily, and when the last has been pressed downwardly upon these jaws to the relative position illustrated in Fig. 5, it is finally gripped positively by the jaws by the operator rocking the handle 96 which operates the eccentric 94 to rock the jaw 70, as hereinbefore described. She next strips the piece of rag junior, Fig. 7, from a board and places it on the table 101.

Operator No. 2 places an insole, Fig. 8, on the last and pulls over the toe of the lining around as far as the shank of the last and sticks the edges of the lining to the insole.

Operator No. 3 pulls over the lining at the heel portion of the last and rolls down the lining all around, sticking the edge of it to the insole.

Operator No. 4 gages the shoe with a marking gage and makes a line on the lining at the heel and on the vamp portion of the lining, these two lines being for the purpose of guiding a subsequent operator in placing stock parts on the lining in the process of manufacture of the shoe. Having gaged the shoe, the operator No. 4 also strips gum piping, Fig. 9, from a book and places it on the shoe so that it can be carried by the conveyer to operator No. 5.

Operator No. 5 applies the piping as follows:—
She removes the piping from the shoe where it has been placed by operator No. 4, places one end of it at the breast of the heel and sticks it to the lining adjacent to the heel portion of the last and around the shoe to the toe. She then carries the piping around the toe along the edge of the lining at the breast of the heel on the opposite side of the last, and then tears off the surplus stock of the piping. The shoe then passes to operator No. 6.

Operator No. 6 attaches the toe tip, Fig. 10, which is a rubberized fabric, to the toe portion of the shoe adjacent the sole. She then takes the rag junior from the table and places it around the heel portion, with the lower edge projecting slightly beyond the bottom of the heel. The shoe then passes to operator No. 7.

Operator No. 7 attaches the heel piece, Fig. 11, which is also a rubberized fabric, by first putting the top edge of the heel piece against the line previously made by operator No. 4 and wiping the heel piece around the heel portion of the shoe and over the rag junior. The shoe then passes to operator No. 8.

Operator No. 8 applies the shank stay, Fig. 12, which is of rubberized fabric and rolls the shank stay and also rolls the piping and heel piece.

Operator No. 9 attaches the filler, Fig. 13, and rolls it to the sole portion of the shoe. The filler is a rubberized fabric.

Operator No. 10 takes the rubber compound upper, Fig. 14, from a book, applies it to the last, pulling over the toe, the same being held to the lining by the adhesion of the rubber compound.

Operator No. 11 pulls the upper around one side and cuts the back seam, being careful to set the upper edge of the upper at the back of the shoe on the gauge mark of the heel portion of the last, and this operator cuts the back seam.

Operator No. 12 pulls the upper around the other side of the shoe and gauges the seam, lapping it over the back seam which had been previously cut and positioned by operator No. 11.

Operator No. 13 wipes the shoe with a damp cloth and rolls the shoe with a rubber roll. This smoothes the upper down on to the parts which have been previously applied, and also marks lines on the upper as may be required to give it the proper appearance and design.

Operator No. 14 performs the same operation as operator No. 13, that is, operator No. 13 and operator No. 14 each take every other shoe, it having been found that it takes too much time for one operator to perform the whole of this operation.

Operator No. 15 skives the shoe and removes the scrap, that is, cuts off the excess amount of the upper which has been folded over the edge of the last and removes the scrap.

Operator No. 16 "stitches" the back seam by means of a knurled roll.

The term "stitches" is used in connection with this art where a knurled roll is employed to give the appearance of stitching to the work being operated upon by the roll, although in reality there are no stitches.

Operator No. 17 removes the shoe from the jack, cements the bottom of the shoe and places it on table 103. She then cements the outsole, Fig. 15, and places it on table 101. Now the bottom of the shoe is covered with an adhesive such as rubber cement and the inner face of the outsole is also covered with a cement, and the endless conveyer carries both the cemented shoe and the cemented outsole along beneath the dryer 106, which vaporizes the solvent which may be present within the cement, such as, naphtha or benzol, so that when the shoe comes out through the other end of the dryer the cement has been dried just sufficiently so that it is somewhat tacky.

Operator No. 18 takes the shoe and the outsole from the conveyer, places the shoe on a convenient support, such as a table, and rolls and "stitches" the outsole into place on the shoe, thus completing the shoe. This last operation is performed by one operator on every other shoe the same as in the case of operators 13 and 14, so that operator No. 19 takes the next shoe and performs the same operation as operator 18.

It will be understood that the number of operations and the particular shape of the parts, etc., may be varied according to the type of shoe which is being manufactured.

The type of shoe to which the foregoing operation particularly applies, in all its details, is one type of men's shoes, but if the shoe were to be a woman's shoe, or youth's shoe, or tennis shoe, or other styles of shoes, the number of operations and the particular way of applying them might vary, but the general operation would be the same, that is, the different parts would be applied in the proper order by successive operators and all of them would pass preferably through the dryer.

In the different operations hereinbefore set forth, the last is tipped to a variety of different positions to suit the convenience of the operator in performing her work and the construction of the lasting jack makes it possible to tip the last to any desired position, that is, it may be swung about the stud 72 in a horizontal plane or it may be swung about the stud 78 in a vertical plane, or it may be swung about the horizontal stud 63. Thus the last is rendered universally adjustable by the construction of the lasting jack.

While we have illustrated one apparatus whereby a last support may be moved or guided in an endless path, we do not intend to limit our invention to the particular embodiment thereof hereinbefore set forth, as a variety of mechanisms or means might be employed to attain the same result, namely, the moving or guiding of a last support in a continuous path whereby the different operations of manufacturing a shoe can be performed by a series of operators.

We claim:

1. Apparatus for manufacturing footwear, the said apparatus comprising an endless conveyer and a series of last jacks mounted in longitudinally spaced-apart relation on said conveyer and freely projecting therefrom for manual accessibility, each jack comprising a last-engaging member mounted for manual adjustment by rotative movement on a plurality of axes with relation to the adjacent portion of the conveyer, the jack comprising a devious arm pivoted at its base to the conveyer and so extending along its pivotal axis extended to a position laterally remote from the said axis extended that a last mounted upon the jack may be rotated therewith about the said axis while the said axis extended lies within the limits of the last.

2. Apparatus for manufacturing footwear, the said apparatus comprising an endless conveyer and a series of last jacks mounted in longitudinally spaced-apart relation on said conveyer and freely projecting therefrom for manual accessibility, each jack comprising a last-engaging member mounted for manual adjustment by rotative movement on a plurality of axes with relation to the adjacent portion of the conveyer, the jack comprising a quick-release last-engaging device adapted to hold a last securely against normal stock-manipulating forces applied in any direction with relation to said device.

3. Apparatus for manufacturing footwear, the said apparatus comprising an endless conveyer and a series of last jacks mounted in longitudinally spaced-apart relation on said conveyer and freely projecting therefrom for manual accessibility, each jack comprising a last-engaging member mounted for manual adjustment by rotative movement on a plurality of axes with relation to the adjacent portion of the conveyer, the jack comprising a devious arm pivoted at its base to the conveyer and extending along its pivotal axis extended to a position laterally remote from said axis extended, a relatively short intermediate member hinged to said arm on an axis transverse to the latter's said pivotal axis, and a last-engaging device hinged to said intermediate member on an axis transverse to the said axis of the intermediate member.

ALFRED A. GLIDDEN.
THOMAS M. KNOWLAND.
LAURENCE H. BURNHAM.